United States Patent [19]
Sarrazin et al.

[11] Patent Number: 5,952,647
[45] Date of Patent: Sep. 14, 1999

[54] FORCE MEASURING APPARATUS WITH OPTICAL SENSOR ENABLING LIMITATION OF ECCENTRICITY DEFECTS IN PARTICULAR FOR BATHROOM SCALES AND METHOD OF MANUFACTURING APPARATUS OF THIS KIND

[75] Inventors: Michel Sarrazin, Massingy; Bernard Pitaud, Annecy; Yves Patras, Rumilly; Benoit Linglin, Cruseilles; Alain Duborper, Sales, all of France

[73] Assignee: SEB S.A., Ecully, France

[21] Appl. No.: 08/820,739

[22] Filed: Mar. 19, 1997

[30] Foreign Application Priority Data

Mar. 20, 1996 [FR] France .................................. 96 03454

[51] Int. Cl.⁶ ........................................................ H01J 5/16
[52] U.S. Cl. ................................ 250/227.14; 250/227.16; 340/555; 73/789
[58] Field of Search ......................... 250/227.14, 227.15, 250/227.16, 227.17; 340/555–557, 541, 524; 73/789, 775, 768, 856

[56] References Cited

U.S. PATENT DOCUMENTS

| 4,740,078 | 4/1988 | Daendliker et al. ............... 250/227.17 |
|-----------|--------|---------------------------------------------|
| 5,134,281 | 7/1992 | Bryenton et al. ................... 250/227.14 |
| 5,293,039 | 3/1994 | Mongiols ........................... 250/227.14 |
| 5,317,147 | 5/1994 | Dandliker et al. ................. 250/227.17 |

FOREIGN PATENT DOCUMENTS

| 0 153 997 A1 | 9/1985  | European Pat. Off. . |
| 2 632 065 A1 | 12/1989 | France . |
| 41 32 100 A1 | 4/1993  | Germany . |
| 2 214 771    | 9/1989  | United Kingdom . |

*Primary Examiner*—Que T. Le
*Attorney, Agent, or Firm*—Stroock & Stroock & Lavan LLP

[57] ABSTRACT

A force-measuring apparatus is provided having a first plate, a second plate disposed above the first plate and spaced apart from the first plate, an optical sensor having at least one optical fiber disposed between the first plate and the second plate, and a clamp for moving the first plate and the second plate together to compress the optical fiber, thereby applying a prestressing force to the fiber to reduce eccentricity effects.

14 Claims, 4 Drawing Sheets

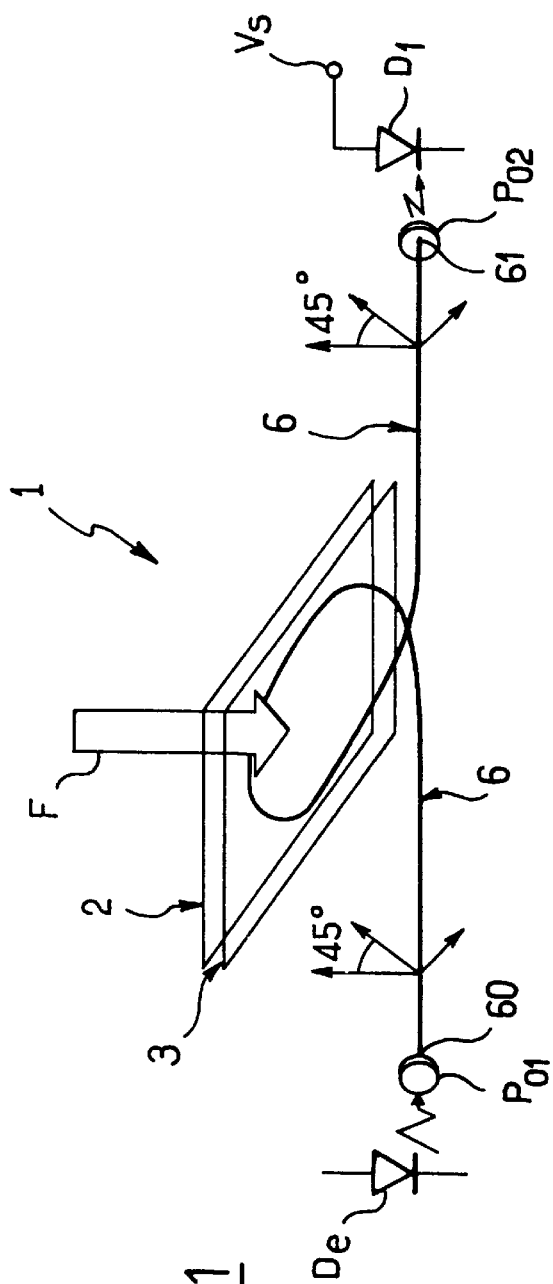
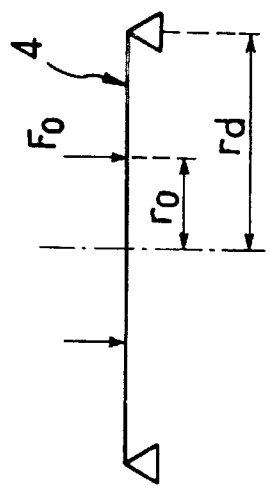
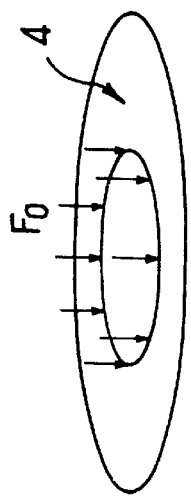
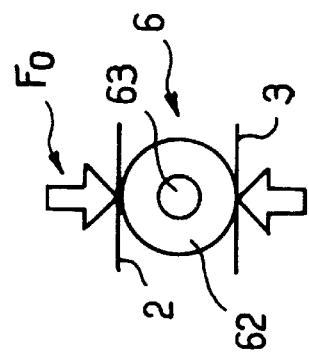

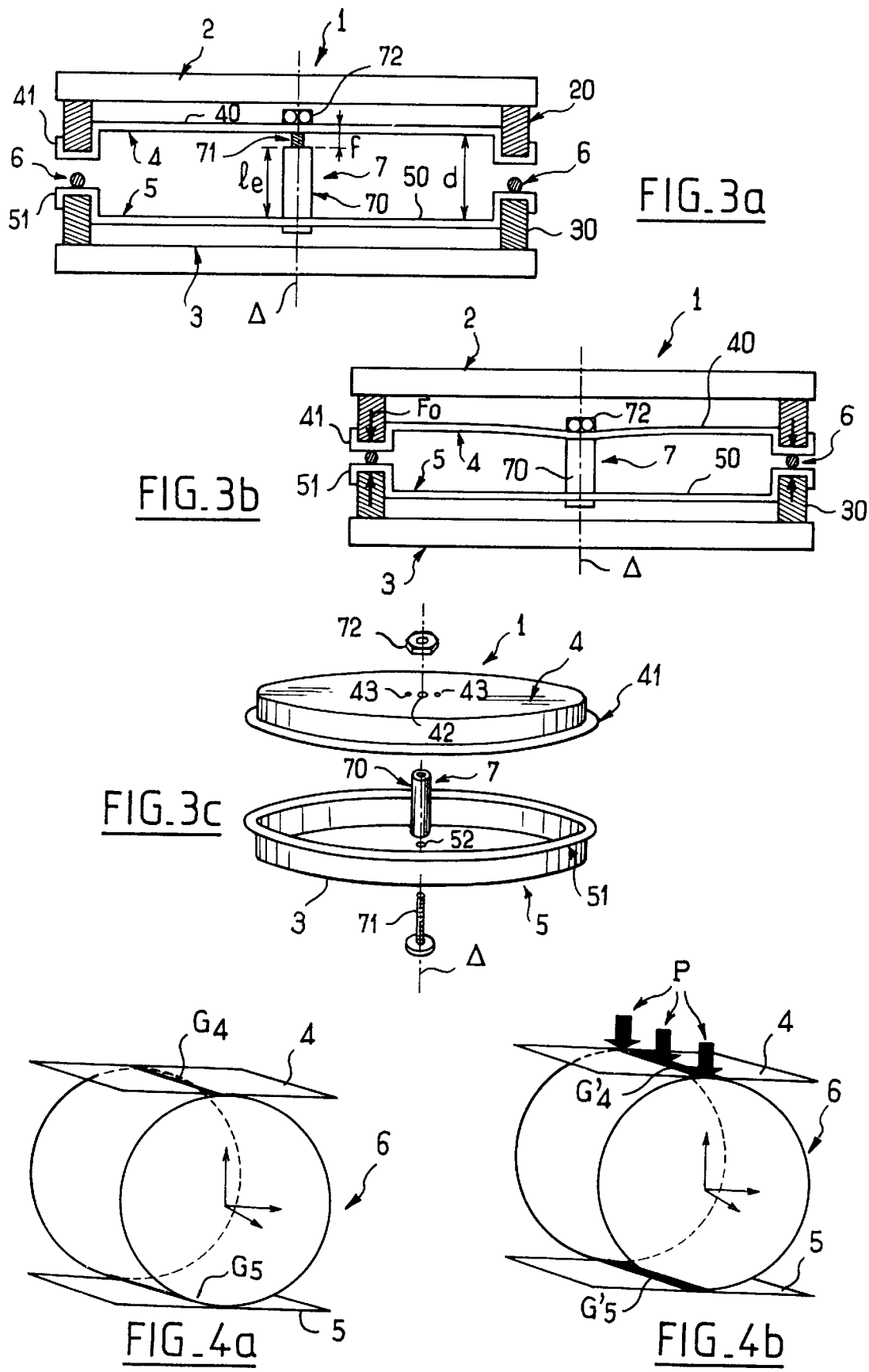

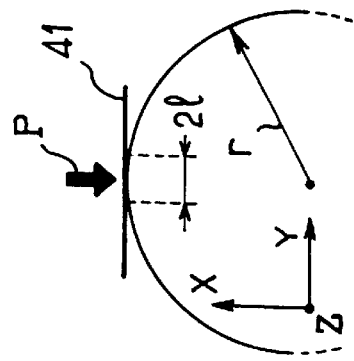
FIG_4e
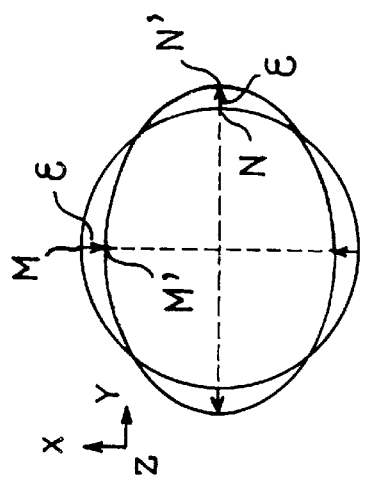
FIG_4d
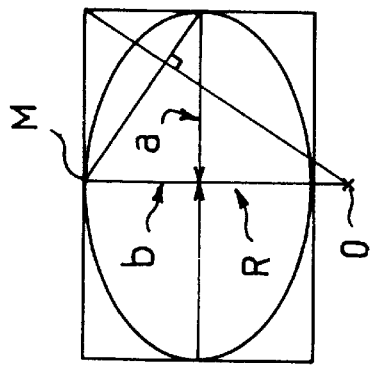
FIG_4c
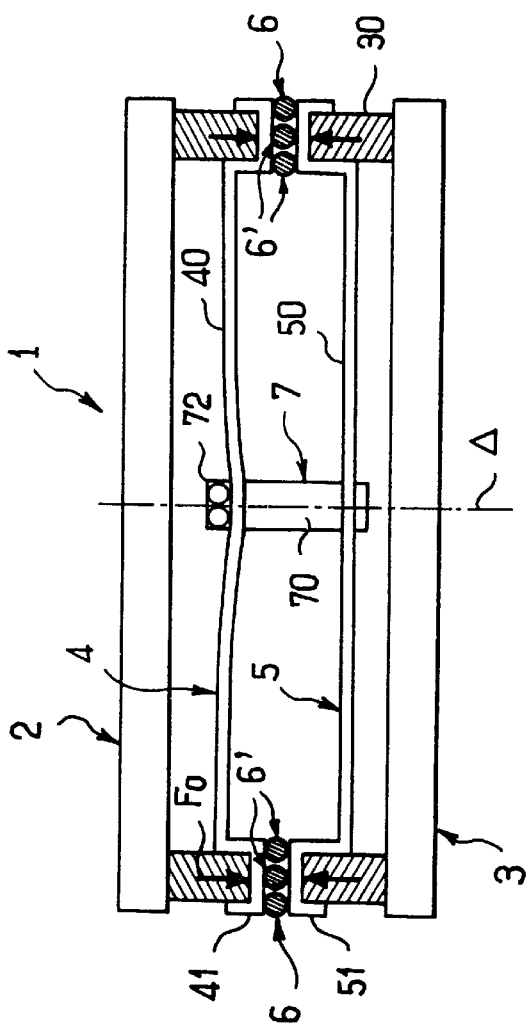
FIG.5

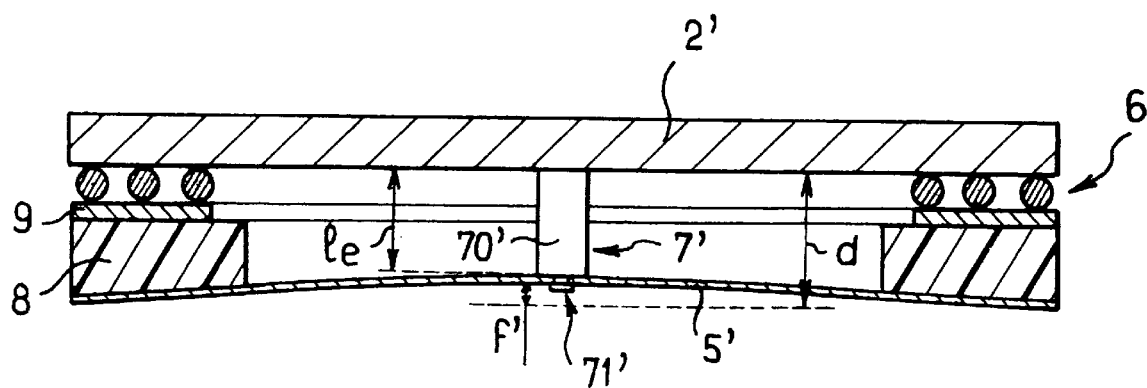
FIG_6

FORCE MEASURING APPARATUS WITH OPTICAL SENSOR ENABLING LIMITATION OF ECCENTRICITY DEFECTS IN PARTICULAR FOR BATHROOM SCALES AND METHOD OF MANUFACTURING APPARATUS OF THIS KIND

BACKGROUND OF THE INVENTION

1. Field of the Invention

The invention concerns force measuring apparatus of the optical sensor type enabling limitation of eccentricity defects, more particularly measuring apparatus in which the optical sensor is optical fiber based.

It also, but not exclusively, concerns the application of measuring apparatus of this kind to weighing apparatus of the bathroom scales type.

2. Description of the Prior Art

It is well known that when a force of the same magnitude (or the same weight) is applied to different points on a sensor the amplitude of the measured signal can vary from one point to another. This is known as an "eccentricity" defect. The invention concerns apparatus intended to limit variations in the measured signal due to this unwanted effect.

Many types of weighing apparatus use strain gauges glued to test bodies. This design has the drawback of requiring sensitivity adjustment because the signal obtained is sensitive to the point of application of the measured force.

To overcome these drawbacks it has been proposed to replace the strain gauges by an optical sensor, in particular an optical fiber based optical sensor.

There are three main families of optical fiber sensors: intensity sensors, interferometer sensors and polarimeter sensors.

A polarimeter sensor is based on a monomode optical fiber, for example a standard silica fiber that can have a very low intrinsic birefringence (a so-called "LoBi" or "Low Birefringence" optical fiber, or a more conventional fiber with a very low residual birefringence). Linearly polarized light is injected into the optical fiber. The light source used for this can be a laser, for example a laser diode. However, the emitted light does not have any particular polarization direction. Accordingly, it must be linearly polarized using a polarizer before it is injected into the optical fiber.

A stress is applied to the optical fiber, a pressure force (weight) in the context of the invention. This causes birefringence which modifies the state of polarization. The core and the cladding of the optical fiber assume an elliptical shape, this being the phenomenon inducing the birefringence.

The force F exerted on the optical fiber (the weight placed on the weighing platform) is deduced from the phase shift $\psi$ due to the birefringence using the following equation:

$$F = \frac{\lambda_{vac}}{2K\pi} \cdot \Delta\varphi \quad (1)$$

where $\lambda_{vac}$ is the wavelength of the light wave in vacuum and K is a constant such that:

$$K = \frac{4n^3}{\pi} \cdot \frac{1\nu}{E} \cdot (P_{12} - P_{11}) \cdot \frac{1}{2r} \quad (2)$$

where:

| n | core material refractive index | n = 1.458 |
|---|---|---|
| $P_{12}$ | photo-elastic matrix coefficient | $P_{12}$ = 0.27 |
| $P_{11}$ | photo-elastic matrix coefficient | $P_{11}$ = 0.121 |
| $\nu$ | Poisson's coefficient | $\nu$ = 0.17 |
| E | Young's modulus of the silica | E = 7 $10^{10}$ N/m² |
| 2r | fiber diameter | 2r = 125 $\mu$m |

Equation (1) clearly shows that the phase shift $\psi$ is a direct function of the force F (weight) applied to the optical fiber and, additionally, that it is independent of the length L of the stressed optical fiber.

To measure the phase shift at the output of the optical fiber, the luminous intensity is in practise measured using an opto-electronic converter. This is generally a photodiode that detects the aforementioned luminous intensity and converts it into an output electrical signal. The luminous intensity I obeys the following law:

$$I=I_0 \cdot (1+\cos(\Delta\psi)) \quad (3)$$

where $I_0$ is the intensity without any phase shift, i.e. in the absence of any stress.

If a quarter-wavelength optical plate and a polarizer imposing an orientation $\theta$ are placed between the light source and the optical fiber, the intensity obtained obeys the following law:

$$I=I_0 \cdot (1+\cos(\Delta\psi-2\theta)) \quad (4)$$

Measuring apparatus of this type is described in French patent application No. 95 06853 filed Jun. 9, 1995.

FIG. 1 is a diagrammatic representation of its general structure.

The measuring apparatus 1 includes a base 3 on top of which is a platform 2 to which a force F is applied in a direction perpendicular to the plane of the base 3 and the platform 2. An optical fiber 6 is disposed between these two members, advantageously coiled upon itself to form one or more turns. The radius of curvature of the turns must naturally be compatible with the mechanical characteristics of the optical fiber.

In the example shown, the measuring apparatus 1 includes a light source $D_e$, for example a semiconductor laser diode. Between a first end or input face 60 of the optical fiber 6 and the diode $D_e$ is a first polarizer $P_{01}$. In a similar way, a second polarizer or analyzer $P_{02}$ is placed between the second end 61 of the optical fiber 6 and an optoelectronic converter $D_1$, for example a photodiode. The latter converts the luminous intensity received into an output electrical signal $V_S$. The polarization axes are parallel to each other and preferably at 45° to the direction of application of the force F. Of course, it is generally necessary to provide various supplementary optical devices, especially focusing devices, which are well known in themselves.

The electrical output signal $V_S$ is then processed by conventional electronic circuits, either in analog form or, preferably, in digital form. All that is required for this is to provide an analog-digital converter and control circuits for a digital display unit such as a liquid crystal display. A microprocessor could equally well be used, executing various preprogrammed functions.

The force measuring apparatus briefly described above has many advantages, including:

integration of the effect along the optical fiber 6, i.e. measurement of the total phase shift;

little influence of centering, which depends only on the plate-fiber linking conditions;

extreme thinness, the thickness specific to the optical element (the optical fiber 6) being virtually negligible (typically 1/10 millimeter);

an equally small displacement;

high sensitivity: typically 20 g for a load of 140 kg and an optical fiber length of 1.5 m; and many construction options since the load is distributed over all of a ring of optical fibers.

In a preferred embodiment circular or even annular structures are used, i.e. structures having an open central area.

It has nevertheless been found that, contrary to what is suggested by the theory, the eccentricity defects are significant, typically in the order of ±1%.

Accordingly, an object of the invention is to limit the unwanted effects of eccentricity defects whilst retaining the advantages of apparatus of the type just mentioned.

SUMMARY OF THE INVENTION

The invention therefore consists in force measuring apparatus of the optical sensor type including a measuring platform to which a force to be measured is applied, a base, an optical sensor for measurement of stresses due to said force to be measured of the polarimeter type including at least one optical fiber disposed between said plate and said base, said optical fiber having birefringence induced in it when it is subjected to a pressure force along a diameter, and elastic means for applying a prestressing force of predetermined magnitude to said optical fiber to reduce "eccentricity" defects and including a top plate and a bottom plate disposed on opposite sides of said optical fiber and in contact with the latter to form a contact structure to transmit a force to be measured and means for moving said two plates closer together to compress said optical fiber and apply said prestressing force of predetermined magnitude.

The invention additionally consists in bathroom scales incorporating force measuring apparatus as defined above.

The invention will be better understood and other features and advantages will emerge from a reading of the following description with reference to the appended drawings.

BRIEF DESCRIPTION OF THE DRAWINGS

FIG. 1 is a diagram showing the operating principle of force measuring apparatus using a polarimeter optical sensor configuration.

FIG. 2a is a diagram showing an optical fiber subjected to a continuous prestressing load.

FIGS. 2b and 2c are similar geometrical constructions showing the force diagram of the prestressing forces.

FIGS. 3a through 3c show a first embodiment of force measuring apparatus of the invention.

FIGS. 4a through 4e show the deformation of an optical fiber subjected to a crushing force.

FIG. 5 shows a preferred embodiment of force measuring apparatus of the invention.

FIG. 6 shows a further variant of the first embodiment.

BRIEF DESCRIPTION OF THE PREFERRED EMBODIMENTS

Referring to FIG. 1, the eccentricity defects are essentially due to the lack of flatness of the plates forming the base 3 and the platform 2, more precisely the surfaces in contact with the optical fiber 6 and compressing the latter, or to variation in the diameter of the optical fibers (typically ±3 μm).

Some parts of the optical fiber 6 are not in contact with the base 3 and the platform 2, or only slightly so, leading to irregular measurement results when the same load is applied at different places.

A first solution would be to straighten the surfaces. An experiment has been conducted using Pyrex plates with straightened surfaces but otherwise the structure as just described, for example. The defects previously observed were eliminated, or at least the residual defects were negligible.

However, although this solution gives satisfactory technical results, it is not economically viable in the case of the main intended application of the invention, that is to say force measuring apparatus for consumer applications. For this type of apparatus the unit cost must be as low as possible, for given levels of accuracy and quality.

Accordingly, in a first embodiment of the invention, whilst retaining the general structure just described, particular provisions are adopted to attenuate very strongly the defects observed without significantly increasing either the complexity of the apparatus or its unit cost.

In accordance with one important feature of the invention, to remedy this defect a prestressing force of predetermined magnitude is applied to the optical fiber 6.

FIG. 2a is a diagram showing an optical fiber 6 subjected to a permanent prestressing force $F_0$. The fiber usually includes a protective sheath 62, made from epoxy-acrylate or polyacrylate, for example, and the optical fiber 63 proper, forming a waveguide. The latter comprises a core and cladding, both of glass to ensure good metrological properties. The sheath 62 provides effective mechanical protection.

The dimensions of the apparatus must be such that the force on the fully stressed optical fiber 6 is less than its elastic limit, typically less than 1N/mm. In this case the minimum length of the compressed fiber is 1 m.

FIGS. 3a through 3c are diagrammatic representations of one embodiment of force measuring apparatus 1 of the invention. To be more precise, FIG. 3a shows the apparatus 1 in cross-section before assembly and FIG. 3b shows it after assembly. FIG. 3c is an exploded view showing a detail of the apparatus 1. It will be assumed that the structure of the force measuring apparatus 1 is that of a circular body of revolution.

As previously, the force measuring apparatus 1 includes a base 3 on top of which is a platform 2. It further comprises a top disk 4 and a bottom disk 5, both made from an elastic material, disposed between the base 3 and the platform 2. Given the magnitude of the prestressing force required, these are preferably metal disks with dimensions such that their deformation remains within the limits of elastic deformation. The disks 4 and 5 have respective circular central areas 40 and 50 surrounded by respective U-shaped rings 41 and 51. The disks 4 and 5 are disposed head-to-tail so that the bottoms of the U shapes are face-to-face and separated only by the thickness of the optical fiber 6. It is these bottoms that exert a permanent prestressing force $F_0$ on the optical fiber 6, at rest, and a force F to be measured during measurement. To be more precise, the force F exerted on the optical fiber 6 is then equal to the weight P placed on the platform 2 plus the prestressing force $F_0$. It is a simple matter to subtract this force $F_0$ since it is known and constant. The value of the force F to be measured is deduced in this way.

Means 7 for moving the disks 4 and 5 close together are placed in the central area of the disks 4 and 5. In the example described, these means include a spacer 70 having a length $l_e$ less than the distance d between the two disks in the initial state (see FIG. 3a). To be more precise, the length le of the spacer 70 is given by the following equation:

$$l_e = d - f \quad (5)$$

where f is the deflection required when the plates are moved towards each other to obtain a particular prestressing force such that:

$$f = -\frac{P}{8\pi D} \cdot \left[ r_0^2 \cdot \mathrm{Ln}\left(\frac{r_0}{a}\right) + (r_d^2 - r_0^2) \cdot \frac{(3+v)}{2(1-v)} \right] \quad (6)$$

with:

D: stiffness coefficient of the plate.

To be more precise, D obeys the following law:

$$D = \frac{Eh^3}{12(1-r_d^2)} \quad (7)$$

and h: thickness of the disk 4;

E: Young's modulus;

v: Poisson's coefficient;

$r_d$: radius of the disk;

$r_0$: distance from the center of the plate 4 to the circular distribution of the force $F_0$.

FIGS. 2b and 2c show the diagram of forces, with the above parameters, respectively in perspective and in side view.

To obtain the aforementioned deflection f, a conventional "screw 71-nut 72" system may be used to move the two plates 4 and 5 closer together when the nut 72 is screwed home (see FIGS. 3a and 3b). In this condition, the bottoms of the rings 41 and 51 apply a permanent prestressing force $F_0$ to the optical fiber 6.

For example, if the prestressing force required is 20 kg, with a steel plate 1 mm thick, a diameter $r_d$ of the disk 4 equal to 50 mm and $r_0$ equal to 5 mm, the deflection f must be equal to 1.25 mm. Knowing d, which is a design parameter, the length $l_e$ of the spacer 70 is readily deduced from equation (5) above.

FIG. 3c is an exploded view showing the structure of the plates 4 and 5 in more detail.

They have respective central orifices 42 and 52 through which the shank of the clamping screw 71 passes. Means must be provided to prevent any relative rotation of the disks 4 and 5 after they are clamped up as this could damage the optical fiber 6 disposed in a spiral between the bottoms of the rings 41 and 51. Peripheral holes 43 may be provided around the central hole 42 for this purpose, as shown in FIG. 3c. A square or rectangular central hole 42 could equally well be used, which would also prevent this unwanted phenomenon of rotation.

The base 3 and the platform 2 are joined to the assembly formed by the two contiguous disks 4 and 5 via two peripheral rings: a ring 30 above the base 3 and a ring 20 below the platform 2. The rings 30 and 20 are fixed at one end to the base 3 and to the platform 2, respectively. The other end is inserted into the respective grooves that the rings 51 and 41 form.

In the embodiment described, the prestressing strongly reduces eccentricity defects.

The optical fiber used in the context of the invention is weakly birefringent, however. Its core and its cladding are advantageously of silica. The protective sheath 62 (FIG. 2a) is made from polyacrylate, for example, as already indicated. It is typically 15 micrometers thick. Accordingly, when the optical fiber 6 is prestressed between the two plates 4 and 5, as just described, the exterior sheath 62 is deformed, at first elastically and then visco-elastically. This is known as "cold flow".

We have noticed, in cold flow tests with sheathed optical fibers, that the fibers deform during the first cold flow tests and do not resume their initial shape. It is as if they were "compacted", so to speak, by the first series of cold flow experiments.

The invention takes advantage of these observations, as explained below.

To do this, the phenomenon of plasticity of the protective sheath is accelerated.

The method of making the force measuring apparatus of the invention comprises the following steps:

a/ compression of the optical fiber for use in the measuring apparatus between two plates;

b/ heating of the optical fiber under pressure, to a particular temperature, or chemical treatment, either of these treatments being maintained for a specified time interval.

Heating is effected in an oven. The temperature and the time mentioned above naturally depend on the material from which the protective sheath is made. With polyacrylate the temperature is typically in a range from 100° C. to 200° C. and the time is typically between ½ hour and 2 hours.

The optical fiber 6 then mates perfectly with the shapes of the plates 3 and 4, more precisely (in the example described) with the bottoms of the rings 31 and 41, between which it is disposed. Part of the outer sheath (62; FIG. 2a) is driven out of the contact area between the optical fiber proper (63; FIG. 2a) and the bottoms of the top and bottom rings 41 and 31.

Chemical treatment is carried out in the conventional way using a product known to optical fiber users as "stripper". An efficient solvent such as "NMP" (N Methyl Pyrolidone) does this job well.

This phenomenon restricts cold flow and its unwanted consequences.

It can lead to unwanted effects of its own, however. Being no longer externally protected, or at least less well protected (because of the disappearance of all or part of the sheath material), the optical fiber 6 becomes extremely sensitive to its thermal environment and its direct mechanical environment (in the "optical fiber 6-structure 31/41 contact area"). The resulting non-linearity phenomena also cause eccentricity defects.

Although it is a relatively simple matter to compensate the effects of temperature variation numerically (for example by measuring them using a varistor), it is much more difficult to compensate contact variations in the "fiber-structure" contact areas.

In accordance with an additional embodiment of the measuring apparatus of the invention, specific provisions are therefore included for alleviating the previously mentioned eccentricity defects.

It is as well to remember that the phase shift due to birefringence is directly proportional to the weight placed on the platform or, more generally, to the force applied to the latter, in accordance with equations (1) and (2) above.

This relationship is based on the Hertz theory of contact between a cylinder of infinite length and two plates between which it is disposed. The optical fiber 6 can be regarded as equivalent to a cylinder of this kind, even though its length is of course finite.

As shown in FIG. 4a, there are two contact generatrices $G_4$ and $G_5$ between the cylinder (i.e. the optical fiber 6) and the two plates 4 and 5 when the fiber is not deformed by a load.

When the cylinder is loaded (weight P), the generatrices widen as the load increases, as shown in FIG. 4b, becoming two contact surfaces $G'_4$ and $G'_5$. At the same time the original circular shape of the optical fiber 6 becomes elliptical.

FIGS. 4c through 4e are geometrical constructions showing the main parameters involved.

The cross-section of the optical fiber 6 is an ellipse inscribed in a rectangle. The top point M on the ellipse being the point at which the load is placed, i.e. the point at which the force is applied. The curvature at this point M varies with the amplitude of the applied force.

The ellipse has a semi-minor axis a (vertical in FIG. 4c) and a semi-major axis b (horizontal in FIG. 4c). R is the radius of curvature of the ellipse at M, i.e.:

$$R = OM = \frac{a^2}{b} \tag{8}$$

The coefficient K previously mentioned (see equation (2)) depends on this radius of curvature R. It may be assumed that in theory R=r, where r is the radius of the optical fiber 6.

It can also be assumed that the perimeter of the optical fiber 6, which is initially circular, remains constant. When the measuring platform is loaded with a weight P (or, more generally, when a force is applied), the point M is depressed along a vertical axis, i.e. the X axis of a XYZ system of axes, as shown in FIG. 4d. The point M moves to M', with MM'=$\epsilon$. Similarly, the point N (on the horizontal Y axis) moves to N', with NN'=$\epsilon$.

The Hertz theory shows that:

$$\sigma_x = \sigma_y = P_0 = \frac{2 \cdot P}{\pi \cdot 1} \tag{9}$$

in which $\sigma_x$ and $\sigma_y$ are the stresses on the X and Y axes (respectively vertical and horizontal) and 21 is the width of the area of the contact strip between the bottom of the ring 41 and the disk 4.

It can be also shown that the field of deformation in the optical fiber is such that:

$$d_x = \frac{1}{E} \cdot (\sigma_x - \nu \cdot \sigma_y) \tag{10}$$

and that the equation below is satisfied since $\epsilon_x = \epsilon_y = P_0$:

$$d_x = \frac{1}{E} \cdot (1 - \nu) \cdot P_0 \tag{11}$$

If the radius r of the optical fiber is equal to 62.5 $\mu$m and the weight P is equal to 120 kg, E being equal to 6.5 $10^{10}$, in this case $d_x$=2.3 $10^{-3}$ mm.

The depression from M to M' is then approximately $62.5 \times 10^{-6} \times 2.3 \ 10^{-3}$, in other words $\epsilon$=0.15 $\mu$m. From equation (8) the new radius of curvature at M is:

$$R = \frac{a^2}{b} = \frac{(r + \varepsilon)^2}{(r - \varepsilon)} \tag{12}$$

The initial radius of curvature being $R_0$=r, the relative variation $\Delta R$ in the radius of curvature satisfies the following equation:

$$\frac{\Delta R}{R} = \frac{R_0 - R}{R_0} \tag{13}$$

So that in the above numerical example:

$$\frac{\Delta R}{R} \approx 7\%.$$

In reality this variation is valid only for a perfectly uniform 120 kg load, i.e. a load perfectly distributed over the optical fiber. Because of the lack of flatness of the surfaces in contact with the optical fiber, there may be localized areas in which the optical fiber is much more stressed even if the structure is uniformly loaded. It follows that in these areas the radii of curvature for a given weight can be much greater than the estimate obtained by calculation (by application of equation (13)).

This phenomenon is one possible cause of eccentricity defects.

In a further embodiment of the invention these defects can be limited by providing supernumary turns of the optical fiber.

FIG. 5 is a diagram showing one example of force measuring apparatus 1 incorporating features specific to this additional embodiment. The apparatus shown has the same basic structure as the apparatus described with reference to FIG. 3b, and constitutes a preferred embodiment of the invention, since members for prestressing the optical fiber are provided, all or part of the protective sheath is removed from the optical fiber in the measuring areas (to avoid the cold flow phenomena) and supplementary turns 6' are added (the original turn being denoted 6).

A prototype has been constructed in which the diameter was 300 mm, there was a single turn of basic optical fiber and the eccentricity defects were approximately 3%. By adding two supernumerary turns the eccentricity defects were reduced to less than 5‰.

Note that the number of "basic" turns is essentially determined by the range of forces to be measured and the dimensions of the apparatus (in particular the diameter of the turns). For bathroom scales, for example, the range is typically from 0 to 120 kg.

Adding turns has many advantages, including:
  a/ the force measuring apparatus becomes much less sensitive to impact;
  b/ the sensitivity coefficient of the optical fiber becomes linear and constant and it is therefore possible to sum phase delays at any point;
  c/ the eccentricity error is greatly reduced; and
  d/ the prestressing force required is reduced, which simplifies the mechanical assembly of the apparatus.

In the foregoing it has been at least implicitly assumed that adding turns of optical fiber was additional to the prestressing and the partial or total removal of the protective sheath from the optical fiber. This combination represents a preferred embodiment of the invention, which minimizes as far as possible the unwanted effects of eccentricity defects.

However, it must be understood that these provisions can be separate, in other words that the addition of turns of optical fiber, on its own, minimizes eccentricity defects. This may be deemed sufficient in some applications.

Finally, FIG. 6 shows a further variant of the first embodiment.

This variant is primarily characterized in that a rigid top or "reference" platform 2' is provided. The platform 2' is made from a hard material, advantageously glass or aluminum. The rigid platform 2' is a few millimeters thick, typically approximately 3 mm thick.

The turns of optical fiber are gripped between this platform 2' and a "flexible platform" 8. The flexible platform 8 is advantageously annular in practise. The annular structure 8 is advantageously made from a plastics material.

A second annular structure 9 is disposed between the ring 8 and the turns of optical fiber 6. Although the contact between the rigid platform 2' and the turns of optical fiber 6 is satisfactory, because of the hardness of the material of the platform 2', this would not apply if they were directly in contact with a flexible material. Also the ring 9, which may be thin, is made from a relatively hard material. This is advantageously aluminum.

It then remains to provide the prestressing force. This force is applied by a prestressing diaphragm 5' and a clamping system 7' comprising a spacer 70' and a screwing member 71'. This assembly 5'–7' has a similar function to the bottom disk 5 and the clamping disk 7 of the devices described with reference to FIGS. 3a through 3c and 5.

The prestressing diaphragm 5' therefore exerts an initial pressure force on the turns of optical fiber 6 via the rings 8 and 9, which are respectively made from a soft and a hard material. The prestressing diaphragm 5' may advantageously be based on a steel plate, typically 1 mm thick.

The method of determining the prestressing force is similar to that described with reference to FIGS. 3a and 3b. In an initial state the platform 2' is at a distance d from the prestressing diaphragm 5' (which is flat in this state). The spacer 70', of length $l_e$<d, creates a deflection f' by means of the screwing means 71' (the diaphragm 5' being curved in this state). Being rigid, the platform 2' is not significantly deformed.

The foregoing description clearly indicates that the invention achieves the stated objectives.

Of course, the invention is not limited to the embodiments described above, in particular with reference to FIGS. 3a through 3c or FIG. 5.

In particular, the numerical values given depend essentially on the precise intended application, type of optical fiber used, range of forces or weights to be measured, etc. The same applies to the materials of the prestressing disks and the fibers.

Although particularly suitable, the circular shape is not critical.

Although particularly well suited to the weighing application, and in particular to bathroom scales, the invention is not restricted to this type of application alone. As indicated, it applies to force measurement in a more general sense.

There is claimed:

1. A force-measuring apparatus, comprising:
    a first plate including a first ring formed at the periphery of said first plate;
    a second plate, including a second ring formed at the periphery of said second plate, and being disposed above said first plate and spaced apart from said first plate;
    an optical sensor having at least one optical fiber, said optical fiber disposed between said first ring and said second ring; and
    a clamp for moving said first plate and said second plate together to compress said optical fiber between said first ring and said second ring, thereby evenly applying a prestressing force to said fiber along the length of said fiber to reduce eccentricity effects of said fiber and induce birefringence therein.

2. The force-measuring apparatus of claim 1, wherein said optical fiber is arranged in a circular fashion having more than one turn.

3. The force-measuring apparatus claimed in claim 1, wherein said optical fiber has a core and a cladding forming an optical waveguide surrounded by a protective sheath, said protective sheath being substantially removed from said optical fiber where said optical fiber contacts said first ring and said second ring.

4. The force-measuring apparatus claimed in claim 1, wherein said optical fiber has a core and a cladding forming an optical waveguide by a protective sheath, said cladding including an organic substance and having a thickness of less than approximately 15 micrometers.

5. The force-measuring apparatus of claim 1, further comprising a spacer disposed between said first plate and said second plate for defining a minimum separation distance between said first plate and said second plate.

6. The force-measuring apparatus of claim 1, further comprising a base disposed below said first plate and a platform disposed above said second plate.

7. The force-measuring apparatus of claim 1, wherein said first plate and said second plate are circular and elastically deformable.

8. The force-measuring apparatus of claim 1, wherein said first ring includes a first U-shaped groove and said second ring includes a second U-shaped groove, and further comprising:
    a base having a top surface and a bottom surface;
    a first annulus disposed between said base and said first U-shaped groove;
    a platform disposed above said second plate; and
    a second annulus disposed between said platform and said second U-shaped groove.

9. The force-measuring apparatus of claim 8, further comprising means to prevent the relative rotation of said first plate and said second plate when said first plate and said second plate are clamped together against said spacer.

10. The force-measuring apparatus of claim 5, wherein said first plate and said second plate have a respective central orifice, and said clamp includes a nut and a bolt having a free end, said free end of said bolt being passed through said central orifices, said nut engaging said free end.

11. The force-measuring apparatus claimed in claim 2, wherein said optical fiber has a core and a cladding forming an optical waveguide surrounded by a protective sheath, said cladding including an organic substance and having a thickness of less than approximately 15 micrometers.

12. The force-measuring apparatus claimed in claim 2, wherein said optical fiber has a core and a cladding forming an optical waveguide surrounded by a protective sheath, said protective sheath being substantially removed from said optical fiber where said optical fiber contacts said first ring and said second ring.

13. The force-measuring apparatus of claim 2, wherein the number of turns of said optical fiber is selected for a predetermined range of forces to be measured.

14. Bathroom scales comprising the force measuring apparatus claimed in any one of claims 3, 12, 4, 11, 1–7, 8–9, 10, 2, and 13.

\* \* \* \* \*